United States Patent
Ervin

(10) Patent No.: US 10,865,024 B2
(45) Date of Patent: Dec. 15, 2020

(54) BOTTLE FOR ADAPTIVE REUSE

(71) Applicant: Keith Ervin, Lakeland, FL (US)

(72) Inventor: Keith Ervin, Lakeland, FL (US)

(73) Assignee: Keith Ervin, Lakeland, FL (US)

( * ) Notice: Subject to any disclaimer, the term of this patent is extended or adjusted under 35 U.S.C. 154(b) by 243 days.

(21) Appl. No.: 15/899,146

(22) Filed: Feb. 19, 2018

(65) Prior Publication Data

US 2018/0237195 A1   Aug. 23, 2018

Related U.S. Application Data

(60) Provisional application No. 62/461,408, filed on Feb. 21, 2017.

(51) Int. Cl.
| | |
|---|---|
| *B65D 65/46* | (2006.01) |
| *B65D 81/36* | (2006.01) |
| *A01G 9/029* | (2018.01) |
| *B65D 23/08* | (2006.01) |
| *B65D 85/52* | (2006.01) |
| *B65D 57/00* | (2006.01) |
| *A01C 1/04* | (2006.01) |
| *B65D 8/00* | (2006.01) |

(52) U.S. Cl.
CPC .............. *B65D 65/466* (2013.01); *A01C 1/04* (2013.01); *A01G 9/0293* (2018.02); *B65D 11/04* (2013.01); *B65D 23/085* (2013.01); *B65D 57/00* (2013.01); *B65D 81/36* (2013.01); *B65D 81/361* (2013.01); *B65D 85/52* (2013.01)

(58) Field of Classification Search
CPC ........ B65D 11/04; B65D 81/36; A61J 1/2041; A61J 1/2093
See application file for complete search history.

(56) References Cited

U.S. PATENT DOCUMENTS

| | | | | |
|---|---|---|---|---|
| 2,786,769 | A * | 3/1957 | Greenspan | A61J 9/00 426/117 |
| 4,703,863 | A * | 11/1987 | Kohus | A61J 9/00 215/11.1 |
| 5,085,330 | A * | 2/1992 | Paulin | A47G 19/2272 215/387 |
| 5,158,809 | A | 10/1992 | Proctor | |
| 6,159,416 | A | 12/2000 | Kawakami et al. | |
| 6,395,170 | B1 * | 5/2002 | Hughes | B01D 35/02 210/232 |
| 8,397,932 | B2 * | 3/2013 | Ichikawa | B29B 11/08 220/62.22 |
| 9,743,803 | B2 * | 8/2017 | Foster | B65D 81/3211 |
| 2006/0265952 | A1 | 11/2006 | Christal | |
| 2012/0181247 | A1 | 7/2012 | Grulke et al. | |

* cited by examiner

*Primary Examiner* — Andrew T Kirsch
(74) *Attorney, Agent, or Firm* — Andrus Intellectual Property Law, LLP

(57) ABSTRACT

A bottle for adaptive reuse includes a bottle body defining an open interior configured to hold a substance therein. A chamber is formed into the bottle body at least in part by a wall between the open interior and the chamber. The chamber is selectively isolated from the open interior of the bottle. A sealing plate at least partially defines the chamber and an outer surface of the bottle. A threaded structure secures the sealing plate to the bottle body.

19 Claims, 6 Drawing Sheets

BOTTLE FOR ADAPTIVE REUSE

CROSS-REFERENCE TO RELATED APPLICATION

The present application claims priority of U.S. Provisional Patent Application No. 62/461,408, filed on Feb. 21, 2017, the content of which is hereby incorporated herein by reference in its entirety.

BACKGROUND

Plastic beverage bottles are a major source of waste, both recycled and unrecycled. Bottles adapted for alternative reuses provide options for the disposal of plastic beverage bottles. This in turn can reduce demands on a recycling system and also eliminate volume from land fills.

U.S. Pat. No. 5,158,809 discloses a greeting card with a growing medium upon which seeds may be grown. However, it does not disclose a structure adapted for a first use as a beverage container, nor does the '809 patent disclose features that particularly protect seeds prior to planting. The '809 further does not disclose any further adaptive reuses of the disclosed greeting card.

U.S. Pat. No. 6,159,416 discloses a biodegradable blow molded container, but does not provide any disclosure of the use of such a container as structure for seed germination.

US Patent Application Publication No. 2006/0265952 discloses a container in which seeds are incorporated into a biodegradable portion of the container. However, the '952 publication does not disclose any additional structural features of the container that are adapted to promote germination and growth of the seeds, or any additional adaptive reuses of the disclosed container.

US Patent Application Publication No. 2012/0181247 discloses a biodegradable container in which seeds are incorporated into or retained by a label affixed to the container. However, the '247 publication does not disclose any additional structural features of the container that are adapted to promote germination and growth of the seeds, or any additional adaptive reuses of the disclosed container.

Therefore, further need exists for plastic beverage bottles that are structurally adapted for reuses, including a reuse of growing plants from seeds.

BRIEF DISCLOSURE

In an exemplary embodiment of a bottle for adaptive reuse, the bottle includes a bottle body defining an open interior configured to hold a substance therein. A chamber is formed into the bottle body at least in part by a wall between the open interior and the chamber. The chamber is selectively isolated from the open interior of the bottle. A sealing plate at least partially defines the chamber and an outer surface of the bottle. A threaded structure secures the sealing plate to the bottle body.

In further exemplary embodiments of bottles for adaptive reuse the bottle includes a thumbscrew located on an exterior surface of the bottle and connected to the threaded structure. In embodiments, the chamber may contain at least one seed.

In still further exemplary embodiments of bottles for adaptive reuse, the threaded structure is a securing rod that includes a lower flange and a threaded top portion. The securing rod extends through a hole in the sealing plate and engages the sealing plate with the flange. The threaded top portion engages a threaded opening in the wall of the bottle body between the open interior and the chamber. The threaded engagement of the threaded top portion and the threaded opening selectively occludes the threaded opening and secures the sealing plate into engagement with the bottle body. The chamber may be formed between the wall of the bottle body and the sealing plate.

In exemplary embodiments of bottles for adaptive reuse, the threaded structure is a chamber plug that includes the sealing plate and a threaded wall that engages threads in the wall of the bottle body between the open interior and the chamber. The chamber plug at least partially defines the chamber. The wall between the open interior and the chamber defines an opening that is selectively occluded by at least the chamber plug. The chamber plug defines an open interior of the chamber. In embodiments, the bottle includes a threaded spout at the top of the bottle body, wherein the threaded spout is of a matching dimension to chamber plug, such that a threaded spout of a first bottle is threadingly engageable with the threads in the wall of the bottle body between the open interior and the chamber.

Further exemplary embodiments of bottles for adaptive reuse include an additional structure arranged in the opening between the open interior and the chamber plug. The additional structure may be a fluid impervious material or may be a filter. The bottle may further include a filter media arranged between the additional structure and the chamber plug. In an exemplary embodiment the filter media may be from activated carbon, ceramic, or ion-exchange resin. In an exemplary embodiment, the additional structure comprises at least one filter and the filter media is arranged between open interior and the chamber plug.

DETAILED DISCLOSURE

A bottle that is structurally adapted for alternative reuse, for example for reuse after a first consumer use, e.g. as a container for a beverage, is disclosed herein. In an exemplary embodiment, a bottle is provided with an internal seed chamber as is disclosed in further detail herein. Embodiments of the disclosed bottle take advantage of a "greenhouse effect" that can be created with the bottle to create desirable conditions for germination of a seed. In further exemplary embodiments, the bottle is constructed of a biodegradable material such as known biodegradable plastic, polymers, resins, or other materials recognized by a person of ordinary skill in the art. In other examples, the bottle may be constructed of cardboard, paper, plant based fibers, or other similar materials. A biodegradable bottle embodiment breaks down after germination of the seed, allowing the plant to continue growth and development.

Still further exemplary embodiments of bottles structurally adapted for alternative reuse are disclosed. These embodiments include bottles structurally adapted for alternative reuse as containers within which plants can grow either as supported gardens or in hydroponic or aquaponic arrangements. In still further embodiments, bottles may be structurally adapted for use as water treatment devices, including but not limited to gravity fed water filters or reverse osmosis water filters. In a still further embodiment disclosed herein, bottles may be structurally adapted for reuse as an algae bioreactor for the growth and harvesting of beneficial algae.

Figure 1:
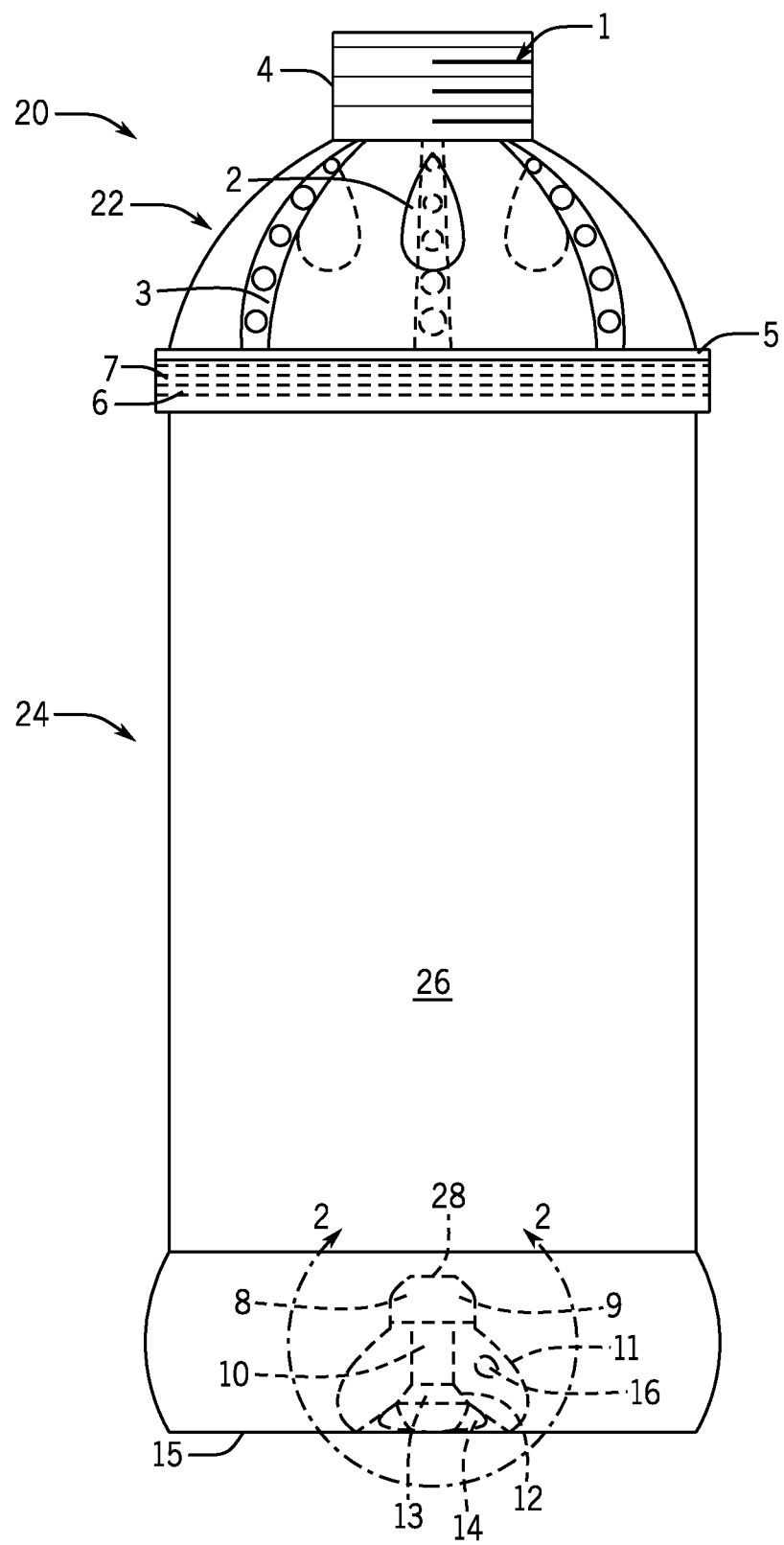
FIG. 1 is a side view of an exemplary embodiment of a bottle with an internal chamber.

FIG. 1 depicts an embodiment of a bottle 20. The bottle 20 includes a top portion 22 and a bottom portion 24. The top portion 22 and the bottom portion 24 are releasably connected with intermeshing internal threads 6 and external threads 7. In an embodiment, the external threads 7 of the top portion 22 engage the internal threads 6 of the bottom portion 24. In an embodiment, the threaded engagement of internal threads 6 and external threads 7 forms a fluid impervious seal. This fluid impervious seal may be facilitated by an additional sealing ring or gasket 5, which may alternatively be sealant tape.

The top portion 22 includes a threaded top 1 suitable for engagement with a correspondingly threaded cap 4 as commonly known with beverage bottles. The top portion 22 further includes indentions 2. The indentations 2 facilitate gripping in order to unscrew the top portion 22 from the bottom portion 24 as will be described in further detail herein. Convex indentations 3 in the top portion 22 retain moisture collected by condensation due to the surface tension of the water within the convex indentations 3.

The lower portion 24 includes the bottle body 26, configured for holding a liquid, such as water or another beverage, however, other liquid or dry contents may be held within the bottle body 26, as would be recognized by one of ordinary skill in the art.

Figure 2:
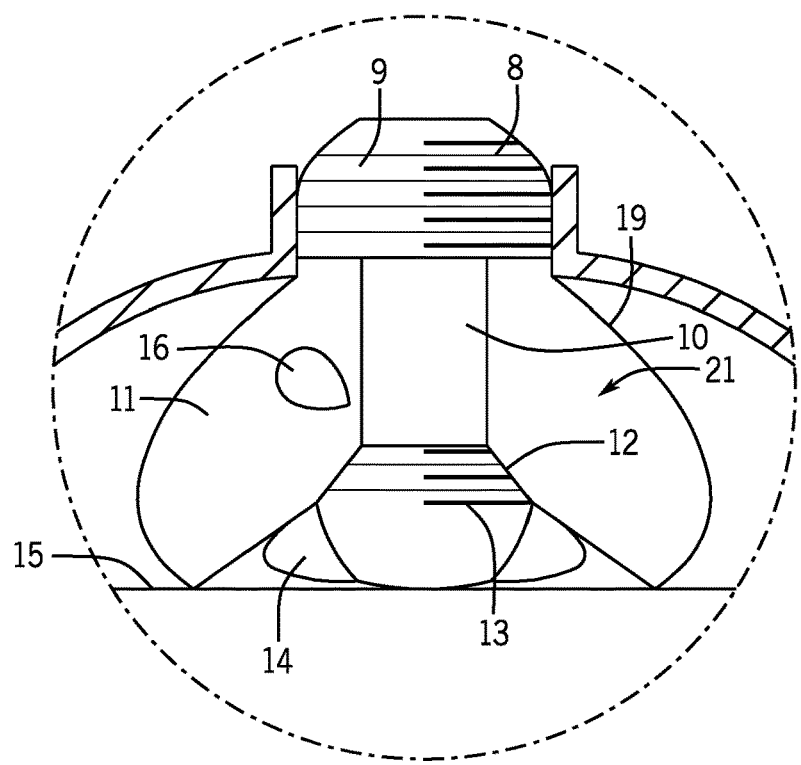
FIG. 2 is an enlarged sectional view of the chamber of the bottle in FIG. 1 as indicated by line 2-2 of FIG. 1.
Figure 3:
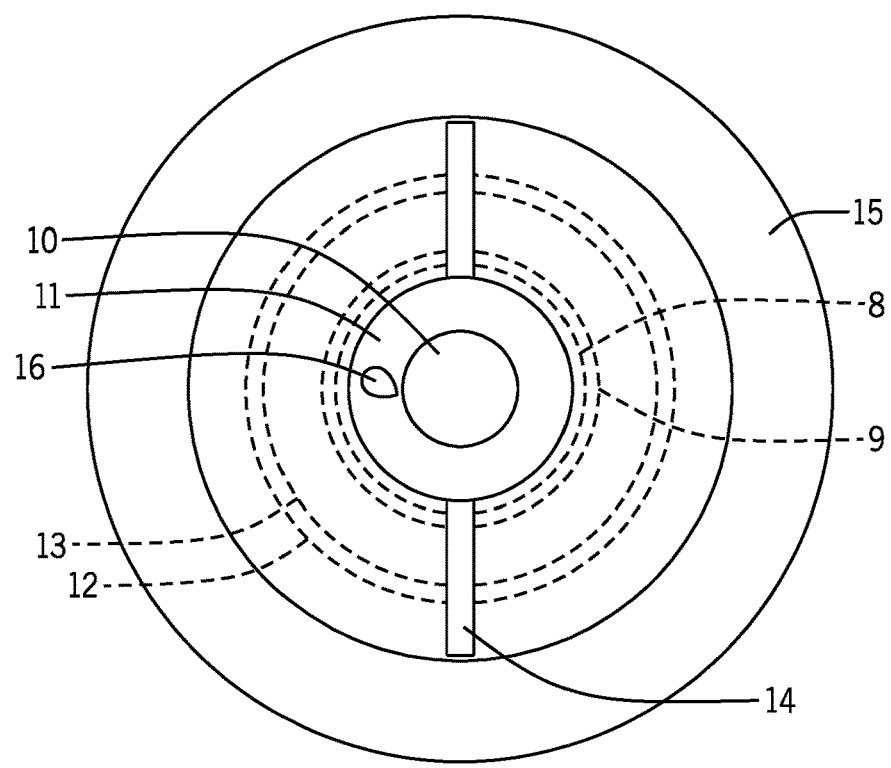
FIG. 3 is a bottom view of an exemplary embodiment of a bottle with a chamber.

Referencing FIGS. 1-3, a seed chamber 11 is secured to a lower surface 15 of the bottom portion 24. FIG. 2 depicts a close up of the seed chamber 11 and FIG. 3 is a bottom view of the bottom of the bottle 20. The seed chamber 11 includes walls 19 that define a hollow interior 21 in which a seed 16 is disposed. The seed 16 is preferably a seed for a perennial flower or a tree. Alternatively, the seed 16 could be a seed for an annual flower, an herb, a fruit, or a vegetable.

In the embodiment depicted, the seed chamber 11 further includes a screw rod 10 disposed through the open interior of the seed chamber 11. The screw rod 10 terminates at one end in a cap 28 which includes upper threads 8 that engage upper threads 9 of the seed chamber 11. The screw rod 10 extends through the lower surface 15 of the lower portion 24. The screw rod 10 terminates at an other end outside of the lower surface 15 with a pair of thumbscrew blades 14 that extend from the screw rod 10. The screw rod 10 occludes the open interior of the seed chamber 11 at the lower surface 15. The seed chamber 11 is further threadedly connected to lower threads 13 of the screw rod 10 with lower threads 12 of the seed chamber 11.

In use, the bottle 20 contains a consumable such as a beverage. After consumption of the consumable, the screw rod 10 is activated by placing a rotative force on the thumb screw blades 14 from the bottom of the lower portion 24. The rotation of the screw rod 10 opens and separates the screw rod 10 from the seed chamber 11 at the threaded engagement between upper threads 8 and 9 and lower threads 12 and 13. The separation of upper threads 8 and 9 opens a space for the stem and leaves of the seed 16 when it sprouts. The separation of lower threads 12 and 13 opens a space for the roots of the seed 16 when it sprouts. In another embodiment, the seed may be stored within an interior of the screw rod 10, and the entirety of the screw rod 10 is removable and plantable to plant the seed with the material of the screw rod 10 breaking down about the seed.

The engagement of threads 6 and 7 between the top portion 22 and the bottom portion 24 is released by rotating the top portion 22 with respect to the bottom portion 24. This rotation may be facilitated by indentations 2 which provide additional grip for applying a rotative force. This separates the top portion 22 from the bottom portion 24.

The bottom portion 24 is then partially buried in the ground and a portion of the bottle body 26 is filled with soil or other planting material. The top portion 22 is then placed over the bottom portion 24.

In one embodiment, the threads 6 and 7 are reengaged, connecting the top portion 22 to the bottom portion 24. This allows for creation of a greenhouse effect within the body 26, improving germination conditions for the seed 16. Moisture within the body 26 condenses on the top portion 22 and convex indentations 3. This facilitates moisture retention within the body 26.

Alternatively, the top portion 22 may be placed upside-down and partially within the body 26 of the lower portion 24. In this configuration, the top portion 22 acts as a funnel to deliver maximum water accumulated by the top portion 22 into the body 26.

Thus, the bottle 20 creates improved germination conditions for the seed 16, and as the seed sprouts and grows, the biodegradable bottle breaks down around the seed such that the new plant's growth is not inhibited.

Figure 4:
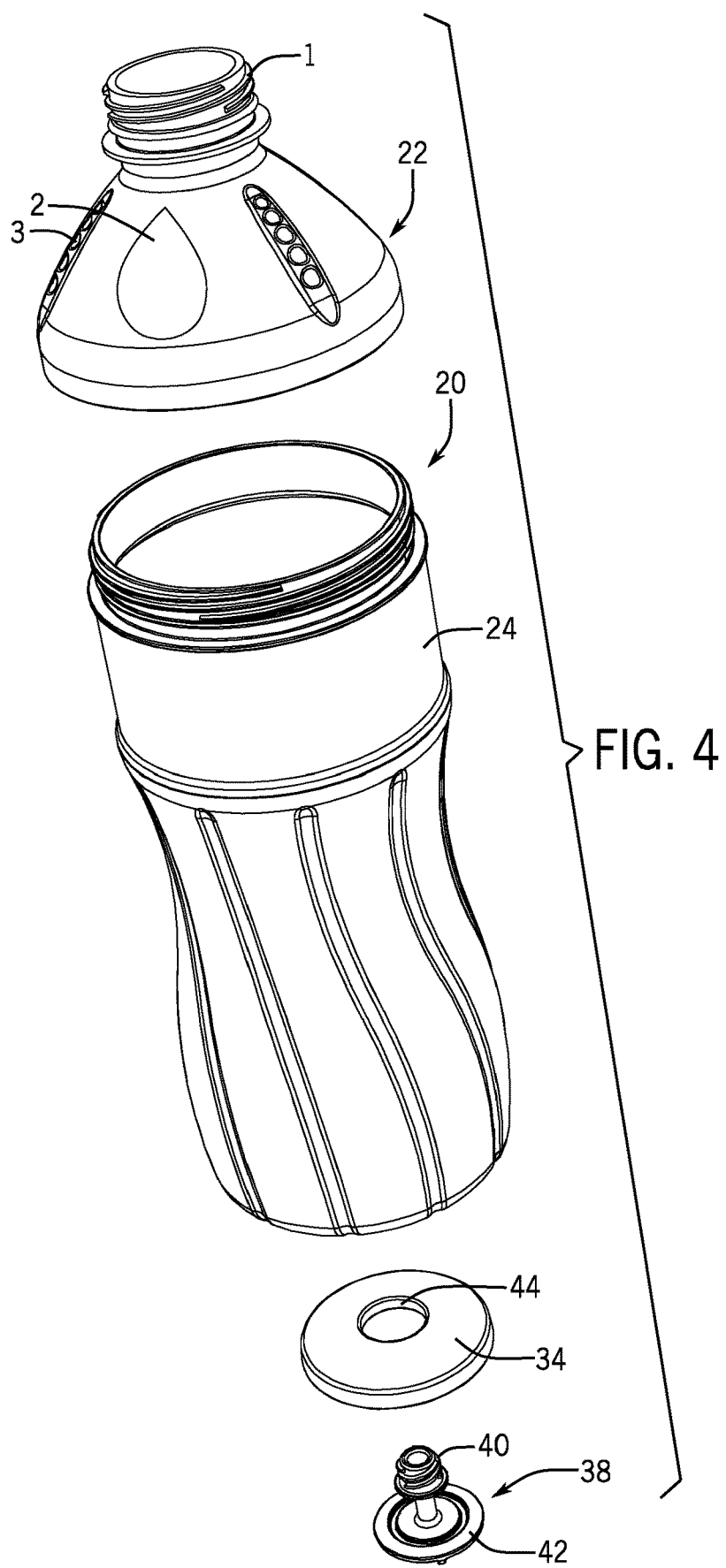
FIG. 4 is an exploded view of an exemplary embodiment of a bottle with a chamber.
Figure 5:
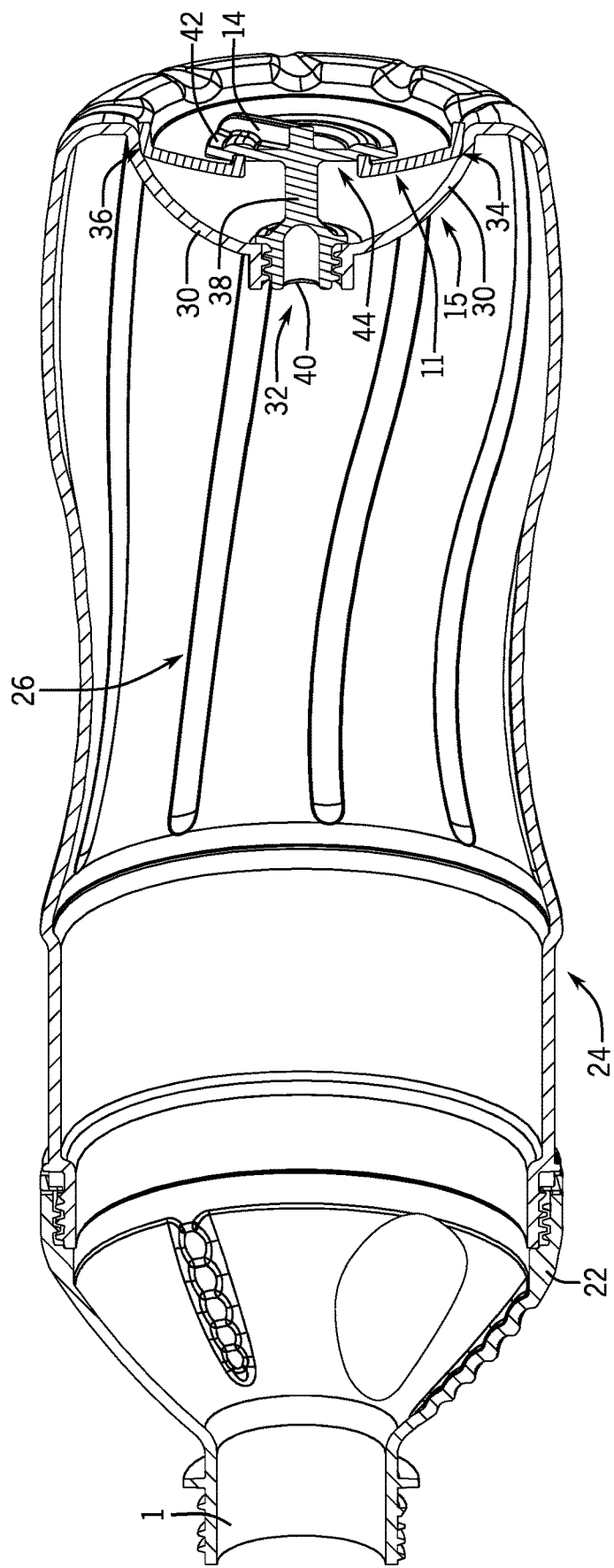
FIG. 5 is a cut-away view of an exemplary embodiment of a bottle with a chamber.

While the chamber 11 has been disclosed in terms of the specific embodiment shown in FIGS. 1-3, it is understood that alternative embodiments of the chamber 11 are within the scope of this disclosure. FIGS. 4 and 5 depict an additional exemplary embodiment of the bottle 20. It will be recognized that like reference numerals are used to indicate like structures between the Figures. In particular, as shown in FIGS. 4 and 5, the chamber 11 may be formed by a concavity 30 formed in the lower surface 15 of the bottom portion 24 of the bottle 20. An opening 32 is exemplarily located at the center and local top of the concavity 30. The opening 32 extends through the lower surface 15, but is selectively occluded as described in further detail herein.

The chamber 11 further includes a sealing plate 34 that is dimensioned to fit partially within the concavity 30 so as to occlude the end of the concavity 30 in the region of the bottom of the bottle 20. The sealing plate 34 may further include a sealing feature 36 which may be mechanical or material in nature to promote a liquid and air tight seal between the sealing plate 34 and the lower surface 15. As shown in FIG. 5, this sealing feature 36 may be a ridge and/or lip between the lower surface 15 and the sealing plate 34 that engage. In still further embodiments, a sealing material or adhesive may be applied between these components.

However, the sealing plate 34 is held in place in engagement with the lower surface 15 by a securing rod 38, which may exemplarily be a screw rod 10 as previously described above, or may be secured in the opening 32 with a friction fit or a frangible fit. In the embodiment depicted, the sealing plate 34 and the securing rod 38 combine to form a chamber plug that seals off the chamber 11 from the exterior. In the exemplary embodiment depicted in FIG. 5, the sealing plate 34 includes a hole 44 through which a portion of the securing rod 38 is received. The securing rod 38 has a threaded top portion 40 that extends through the hole 44 and the interior of the chamber 11 and engages the opening 32, which may be threaded, in a screw fit. The lower end of the securing rod 38 includes a flange 42 that exemplarily includes thumbscrew blades 14. The flange 42 engages the sealing plate 34 exterior of and sealingly about the hole 44 and further secures the sealing plate 34 against the lower surface 15 by way of the engagement between the threaded top portion 40 and the threaded opening 32.

In exemplary use after the bottle 20 is empty of the original contents, the securing rod 38 may be removed, exposing the seed or other contents of the chamber to the elements. In an embodiment wherein the bottle 20 is constructed of a biodegradable material, a seed or seeds may be left in the chamber 11, with the securing rod removed, and used as described above and wherein the leaf and stem sprouting from a seed can grow through the opening 32, while the roots can grow through the opening 44. Eventually, as the plant grows, the plant and roots may push the sealing plate 34 out of engagement with the lower surface 15 for additional room, while also, the bottle formed of a biodegradable material breaks down around the plant.

In still further exemplary embodiments, the chamber 11 may be integrally formed with the lower surface 15 or may be alternatively located in other positions within the bottle 20. These alternative locations may include, but are not limited to elsewhere within the lower portion 24, in the upper portion 22, or even in the cap 4.

Figure 6:
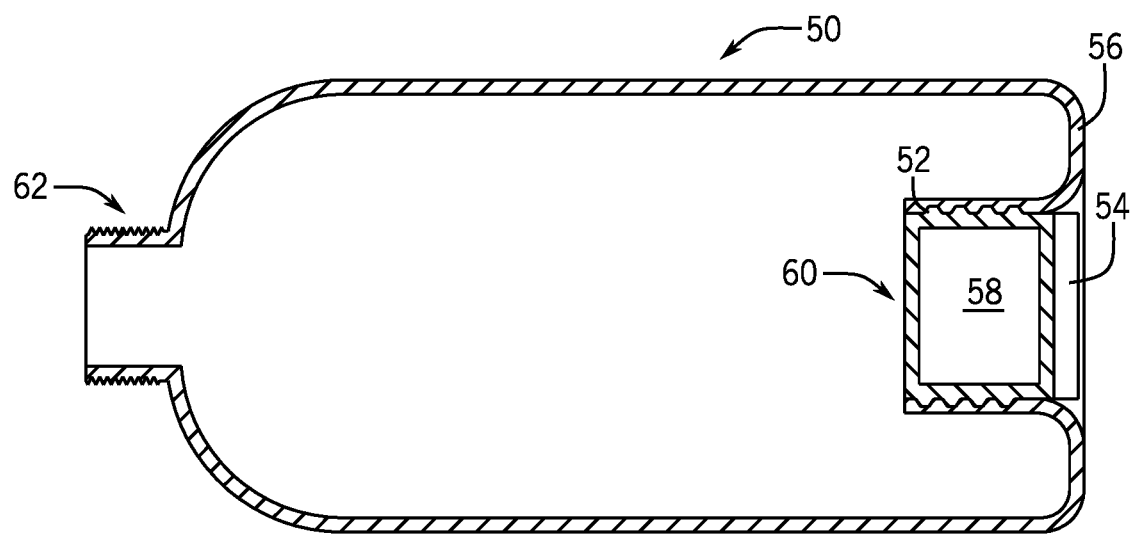
FIG. 6 is a cut-away view of an additional exemplary embodiment of a bottle with a chamber.
Figure 7:
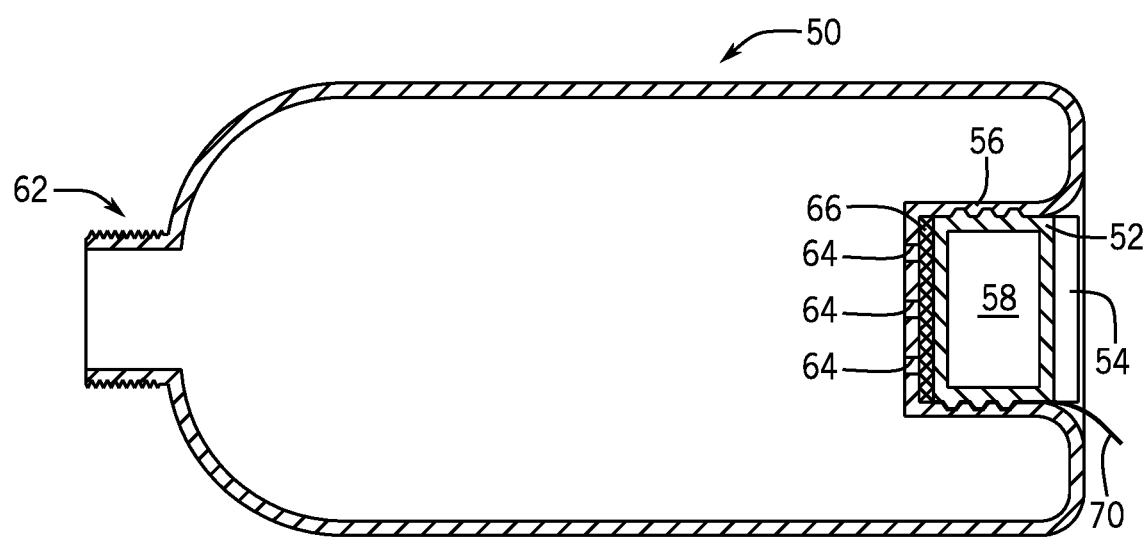
FIG. 7 is a cut-away view of an another exemplary embodiment of a bottle with a chamber.
Figure 8:
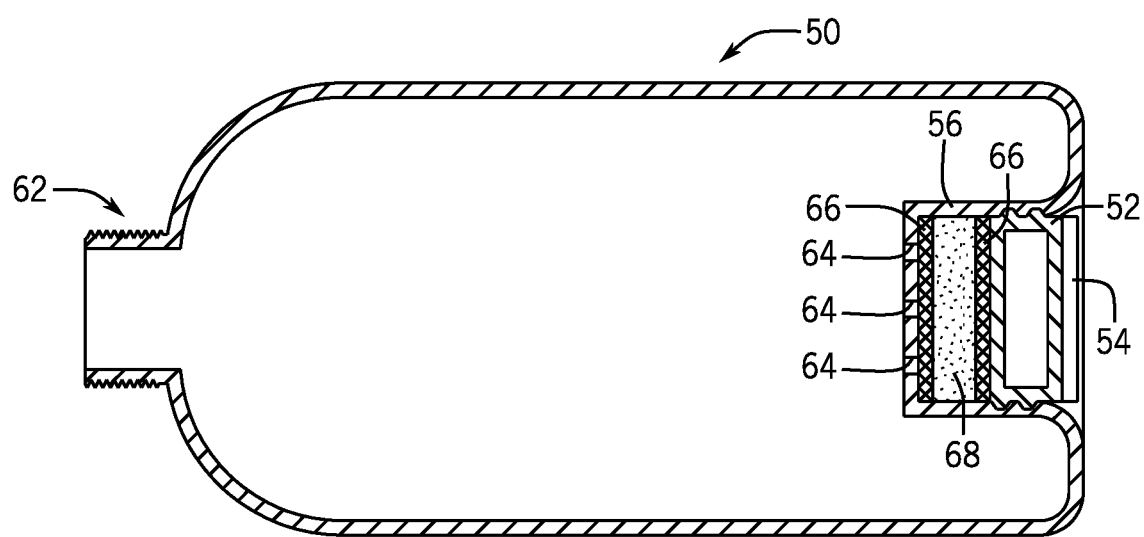
FIG. 8 is a cut-away view of a still further exemplary embodiment of a bottle with a chamber

FIGS. 6-8 depict still further exemplary embodiments of bottles structured for adaptive reuses. It will be recognized that features as shown in FIGS. 6-8 may be combined with features as shown and described above with respect to FIGS. 1-5 to arrive at still further combinations of features while remaining within the embodiments contemplated by the present disclosure. FIG. 6 depicts a still further exemplary embodiment of a bottle 50 that includes a chamber plug 52 with a thumbscrew 54 and is threadedly secured to the wall 56 of the bottle 50. The chamber plug 52 exemplarily includes solid walls that define an open interior 58 which is configured to store a seed or the like as described in the present application. The chamber plug 52 exemplarily combines the features of the sealing plate 34 and the securing rod 38 as described above into a single structure. The threads of the chamber plug 52 engage the wall 56 of the bottle to both occlude an opening 60 through the wall 56 at the bottom of the bottle 50. The chamber plug 52 also provides a sealing plate that defines the open interior 58 of the chamber plug 52 and a bottom surface of the bottle 50 and which includes the thumbscrew 54.

In embodiments, the chamber plug 52 can be disengaged from the bottle 50 by applying a force to the thumbscrew 54. In this manner the chamber plug 52 can be removed, and for example planted so that a seed therein can grow in the ground. In another embodiment, the chamber plug 52 may be openable to remove the contents therein, for example to remove a seed, or algae starter contained therein, as will be described in further detail. In another exemplary embodiment, the chamber plug 52 may be temporarily removed, opened to expose the contents and then reconnected to the bottle 50 with the threads of the chamber plug 52.

In a still further exemplary embodiment, the chamber plug 52 may have the same exterior diameter as the spout 62 of the bottle. The spout 62 may be similarly threaded as the chamber plug 52 such that spout 62 of one bottle can be threadedly connected to the wall 56 of another bottle 50. In another description, the spout 62 is dimensioned to correspondingly fit within the opening 60 in the wall 56 of a bottle so that two similarly constructed bottles can be joined end to end. In this manner, a multi-compartmented structure can be built for reuse of multiple bottles.

FIG. 7 depicts another exemplary embodiment of the bottle 50. In the bottle 50 depicted in FIG. 7, the wall 56 extends across the opening 60, and instead includes a plurality of perforations or holes 64. The chamber plug 52 is similar to that as described above with respect to FIG. 6, but an additional structure 66 is contained within the opening 60, exemplarily between the wall 56 in the region of the holes 64 and the chamber plug 52. In one embodiment, the additional structure 66 is a fluid impervious barrier. The additional structure 66 may exemplarily be a piece of plastic, rubber, or elastomeric material. The additional structure 66 may additionally be a piece of plasticized, waxed, or otherwise coated paper or cardboard. A person of ordinary skill will recognize other examples of additional structures 66 as may be used based upon this disclosure. In use, the chamber plug 52 may be exemplarily removed and the fluid impervious barrier removed before multiple bottles are connected end to end as described above to form a single flow path. In another exemplary embodiment, additional structure 66 is a fluid impervious barrier that also occludes the open interior 58 of the chamber plug 52. In use the open interior may include a seed and germination material. In use, the additional structure 66 keeps the contents of the bottle 50 and the open interior 58 of the chamber plug 52 separate. The chamber plug 52 can be removed and the additional structure removed prior to reconnecting the chamber plug 52 to expose the seed and germination material to water and growing conditions. In a still further exemplary embodiment, the additional structure 66 is a filter material, for example a woven or non-woven mesh. With the chamber plug 52 removed, a second bottle 50 can be connected with the filter material of the additional structure 66 there between. The combination of two bottles can thus be used to as a water filter. In an exemplary embodiment, multiple stages of filter can be constructed with the connection of more bottles with filter material in series.

In a further optional exemplary embodiment depicted in FIG. 7, the bottle 50 includes a pull 70 that is secured to the additional structure 66 and extends out of the exterior of the bottle 50. In exemplary embodiments, the pull 70 may include a string or filament of natural or manufactured fibers or may be a film or thin sheet of polymeric, biopolymeric, or other material. In an embodiment the pull 70 extends between the chamber 52 and the wall 56 to exit out of the bottle 50. The pull 70 may be positioned between the threads on the chamber 52 and the wall 56, or a slot (not depicted) through those structures may be locally provided in the area of the pull 70 to accommodate this structure. In use, the user may place a force on the pull 70 to remove some or all of the additional structure 66, without removal of the chamber 52. In an exemplary embodiment, this may provide for the chamber 52 to be more securely engaged or attached to the bottle 56. In one embodiment, the additional structure 66 is a fluid impervious barrier that may be removed using the pull 70 to expose or fluidly connect the interior 58 of the chamber 52 to the interior of the bottle 50. In another embodiment, the additional structure 66 may be a filter, but a thin film barrier may be secured between the additional structure 66 and the opening 60 to the bottle 50. The pull 70 may be used to remove the thin film barrier to expose the additional structure 66 to the interior of the bottle 50.

FIG. 8 depicts a still further exemplary embodiment of the bottle 50. In the embodiment of the bottle 50 depicted in FIG. 8, multiple additional structures 66 are provided and in an exemplary embodiment, the multiple additional structures 66 are filter media that retain a further filter media 68 there between. In exemplary embodiments, the further filter media 68 may be activated charcoal or an ion-exchange resin. The additional structures 66, which may either be woven or non-woven mesh, ceramic, or other mechanical filter materials, can both serve to provide an additional stage of filtration and to retain the filter media 68. In a still further embodiment, the internal additional structure 66A is fluid impervious and keeps the filter media 68 separate from the contents stored in the bottle 50, until the additional structure 66A is removed as described above. As exemplarily shown in this embodiment, the chamber plug 52 may be reduced to a protective end cap, that retains the additional structures 66 and the filter media 68 within the opening 60.

As described above, the design and dimensioning of the opening 60 in the bottom of the bottle 50 and the spout 62 at the top of the bottle 50 enables a series of bottles 50 to be secured to one another to produce a chain of fluidly connected chambers. This interconnection facilitates a variety of adaptive reuses of the bottle 50. As noted previously these reuses include, but are not limited to plant containers, aquaponic and hydroponic gardens, a bioreactor, or a single stage or multiple stage water filter.

In an exemplary embodiment, a vertically expandable garden can be constructed by connecting multiple bottles together that contain seeds and germination material within the opening 60 and held in place by a subsequent bottle spout and/or chamber plug 52. Heat and sunlight are retained by the bottles, while water can enter the top of the garden to provide moisture to all of the plants held therein through the connected bottles.

In another embodiment, the bottom bottle or bottles of the vertically connected set of bottles can be filled with water, and a hydroponic garden formed with the connected bottles. The upper bottle or bottles can contain soil, aggregate, growing media, etc., which may have been originally provided in chambers 52 as described above. The lower water filled bottles contain nutrients and oxygenated water for the plant roots. Nutrients can be added to the water in the lower bottles by separating the bottles at the threaded connection and directly adding to the water contained therein.

In a still further exemplary embodiment, the bottom bottle or bottles are similarly filled with water and fish reside and plants can be grown in subsequent upper bottles in the connected stack of bottles in a vertically expandable aquaponics garden. The upper bottle or bottles can contain soil, aggregate, growing media, etc., which may have been originally provided in chambers 52 as described above. The roots and/or growing media receive moisture and nutrients from the fish/water bottle or bottles. The nutrients may include ammonia and nitrates which are excreted as a waste product by the fish. These materials can be toxic to the fish, but can be beneficial to the plants. The roots from the plants in the upper bottles detoxify the water while the plants receive the removed nutrients, forming a symbiotic relationship. Fish food can be added to the lower bottles by separating the bottles at the threaded connection and directly adding to the water contained therein.

In a still further embodiment, the chamber plug 52 may contain an algae culture or starter, after the initial contents of the bottle 50 is used, the chamber plug 52 is removed and opened, or the chamber plug 52 is removed and an additional structure of a fluid impervious barrier is removed, exposing the algae culture or starter. With the chamber plug 52 reconnected to the bottle 50, the bottle 50 can be filled with water and/or additional nutrients (the additional nutrients could also be included in the chamber plug 52) and the cap secured over the spout 62. When placed in a compatible environment, for example sunlight and a warm room, the bottle can act as a bioreactor to grow the algae. This may be used to grow a beneficial algae, for example chlorella, spirulina, or astaxanthin for harvest and consumption.

As previously noted, the chamber plug 52 and/or opening 60 may contain water filtration media. The water filtration media may include, but are not limited to activated carbon, redox alloys, sand/gravel/silica, microfiber materials and others as would be recognized by a person of ordinary skill in the art. In examples, interconnected bottles as described above, create a vertical gravity flow water filter than can be used to remove contaminants from drinking water. When multiple bottles are connected, the bottles can each form a filtration stage adapted to efficiently perform a particular type of filtration. In a more specific embodiment, one bottle can include a micro/nano fiber material or membrane that can remove contaminants through reverse osmosis. Squeezing of one of the connected bottles applies pressure to the water inside of the bottle and forces the water through the filter material and traps the contaminants in the filter media between the bottles.

Bottles as described above and made from biodegradable polymer, resin, plastic, etc. are designed to hold water and a dry plant seed/seed packet in the bottom. After the bottle is empty, or discarded, the seed germinates, the bottle degrades, and the seed sprouts and grows. The seed(s) to include, but not limited to trees, fruit, flowers, herbs, etc. In a controlled setting, when the bottle is empty—a threaded thumb screw can be accessed under the bottom side of the bottle. When the bottom thumbscrew is unscrewed, the cap is released from the bottle 20. This cap/screw assembly can be removed. In between the inside of this cap and the bottom of the bottle there is a cavity/space for a seed/seed packet.

In an exemplary embodiment, when the bottom thumb screw is unscrewed/removed it breaks an internal seal to the bottle/water/fluid reservoir. This allows for air, water, and growth access between the internal space, the seed cavity and the ground.

The top portion of the bottle may be screwed into the main body of the bottle via internal threads. The top portion can be removed to act as a scoop to remove dirt from the ground prior to planting the lower part of the bottle. Additionally, this can facilitate access to the interior of the bottle. The lower portion of the bottle can be planted and the top portion of the bottle can be threaded onto the main body in one orientation to act as a greenhouse or it can be placed upside down in the opposite orientation while watering or periods of rain to act as a funnel to collect and channel the water downwards onto the seed/plant.

In exemplary embodiments, the bottle is designed to act as a greenhouse, increase heat and moisture, protect from predation, and to maximize degradation of the bottle material via aerobic and anaerobic reactions between the material and soil. The top domed portion of the bottle may include specially designed convex bubbles to collect humidity. These bubbles magnify sunlight and increase the heat of the interior of the bottle and the material of the bottle, increasing humidity, germination and growth of the seed(ling), and increasing degradation of the bottle. Specialized concave shapes on the top of the domed portion of the bottle enable fingers to grip the top in order to unscrew and remove it. These concave indentions also collect dew and rainwater which then become parabolic lenses, well. These lenses increase the heat inside the bottle, as well as the bottle material, which increases humidity, germination and growth of the seed, and increases degradation of the bottle. The bottle has specially designed grooves and indentions to maximize heat, humidification, condensation, water channeling within the bottle and degradation of the bottle material itself.

The bottle cap can be tightened, loosened, or removed to regulate temperature, humidity, and clean air circulation.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A bottle suitable for adaptive reuse, the bottle comprising:
   a bottle body defining an open interior configured to hold a substance therein;
   a chamber formed into a bottom of the bottle body at least in part by a wall between the open interior and the chamber, the chamber selectively isolated from the open interior;
   a sealing plate at least partially defining the chamber and an outer surface of the bottle; and
   a threaded structure that selectively extends through the chamber to thereby secure the sealing plate to the bottle body and isolate the chamber from the open interior;
   wherein the threaded structure is a securing rod that comprises a lower flange and a threaded top portion, the securing rod extends through a hole in the sealing plate, engages the sealing plate with the lower flange and the threaded top portion engages a threaded opening in the wall of the bottle body between the open interior and the chamber, and wherein the threaded engagement of the threaded top portion and the threaded opening, selectively occludes the threaded opening and secures the sealing plate into engagement with the bottle body.

2. The bottle of claim 1, further comprising a thumbscrew located on an exterior surface of the bottle and connected to the threaded structure.

3. The bottle of claim 1, wherein the chamber contains at least one seed.

4. The bottle of claim 1, wherein the chamber is formed between the wall of the bottle body and the sealing plate.

5. The bottle of claim 1, wherein the bottle body comprises a top portion and a bottom portion, the top and bottom portions are separably connected.

6. A bottle suitable for adaptive reuse, the bottle comprising:
   a bottle body defining an open interior configured to hold a substance therein;
   a chamber formed into a bottom of the bottle body at least in part by a wall between the open interior and the chamber, the chamber selectively isolated from the open interior;
   a sealing plate at least partially defining the chamber and an outer surface of the bottle; and
   a threaded structure that selectively extends through the chamber to thereby secure the sealing plate to the bottle body and isolate the chamber from the open interior;
   wherein the threaded structure is a chamber plug that comprises the sealing plate and a threaded wall and at least partially defines the chamber and engages threads in the wall of the bottle body between the open interior and the chamber.

7. The bottle of claim 6, wherein the wall between the open interior and the chamber defines an opening that is selectively occluded by at least the chamber plug.

8. The bottle of claim 7, wherein the chamber plug defines an open interior of the chamber.

9. The bottle of claim 7, further comprising a threaded spout at the top of the bottle body, wherein the threaded spout is of a matching dimension to chamber plug, such that a threaded spout of a first bottle is threadingly engageable with the threads in the wall of the bottle body between the open interior and the chamber.

10. The bottle of claim 7, further comprising an additional structure arranged in the opening between the open interior and the chamber plug.

11. The bottle of claim 10, wherein the additional structure is a fluid impervious material.

12. The bottle of claim 10, wherein the additional structure comprises a filter.

13. The bottle of claim 10, further comprising a filter media arranged between the additional structure and the chamber plug.

14. The bottle of claim 13, wherein the filter media is selected from activated carbon, ceramic, and ion-exchange resins.

15. The bottle of claim 6, wherein the bottle body comprises a top portion and a bottom portion, the top and bottom portions are separably connected.

16. The bottle of claim 15, wherein the top portion of the bottle body comprises at least one convex feature and at least one concave feature configured to collect condensation in the interior of the bottle.

17. The bottle of claim 15, wherein the top portion and the bottom portion are connected by a threaded engagement.

18. The bottle of claim 6, wherein the bottle is constructed of biodegradable material.

19. The bottle of claim 6, wherein the chamber contains at least one seed.

* * * * *